United States Patent
Gupta (10) Patent No.: US 12,117,994 B2
(45) Date of Patent: *Oct. 15, 2024

(54) MULTIUSER SYNCHRONOUS CONCLAVE BLOCKCHAIN TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,009

(22) Filed: Sep. 21, 2023

(65) Prior Publication Data
US 2024/0012807 A1 Jan. 11, 2024

Related U.S. Application Data

(63) Continuation of application No. 17/501,209, filed on Oct. 14, 2021, now Pat. No. 11,853,293.

(51) Int. Cl.
*G06F 16/23* (2019.01)
*G06F 16/27* (2019.01)
*G06F 16/93* (2019.01)

(52) U.S. Cl.
CPC .......... *G06F 16/2379* (2019.01); *G06F 16/27* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 10,938,548 B2 * | 3/2021 | Mercuri | H04L 9/0643 |
| 2020/0020165 A1 * | 1/2020 | Tran | G06F 3/011 |
| 2020/0104331 A1 * | 4/2020 | Azarias | H04L 9/50 |
| 2020/0234380 A1 * | 7/2020 | Dulori | G06Q 30/0283 |
| 2022/0358238 A1 * | 11/2022 | Bag | G06V 30/414 |

OTHER PUBLICATIONS

Saqib Rasool; Docschain: Blockchain-Based IoT Solution for Verification of Degree Documents; 2020; IEEE; pp. 827-837 (Year: 2020).*
Pedro Velmovitsky;A Blockchain-Based Consent Platform for Active Assisted Living: Modeling Study and Conceptual Framework; J Med Internet |vol. 22|iss. 12|e20832; pp. 1-18 (Year: 2020).*

* cited by examiner

*Primary Examiner* — Albert M Phillips, III
*Assistant Examiner* — Jermaine A Mincey
(74) *Attorney, Agent, or Firm* — Weiss & Arons LLP (57) ABSTRACT

Apparatus and methods are provided for multiple smart glasses to enter in a distributed ledger network such as a blockchain to concurrently modify documents. These networked smart glasses may store the document and any changes made to the document in a distributed ledger, communicate the changes to the other smart glasses and request approval or disapproval of the changes. Each smart glass or user may approve or disapprove the changes suggested by other users. The document may only be finalized when all suggested changes are approved or disapproved.

19 Claims, 8 Drawing Sheets

MULTIUSER SYNCHRONOUS CONCLAVE BLOCKCHAIN TECHNOLOGY

CROSS REFERENCE TO RELATED APPLICATION

This application is a continuation of U.S. patent application Ser. No. 17/501,209, filed on Oct. 14, 2021 and entitled "MULTIUSER SYNCHRONOUS CONCLAVE BLOCKCHAIN TECHNOLOGY," which is hereby incorporated by reference herein in its entirety.

FIELD OF TECHNOLOGY

This application provides apparatus and methods for overcoming technical challenges of updating documents and other files with multiple user inputs at the same time using secure distributed ledger ("blockchain") technology.

BACKGROUND

For the purposes of this disclosure, a pair of smart glasses (which may be referred to as a "smart glass") may be understood to mean wearable eyeglasses that include one or more processors, displays, network interface cards, and memory, as well as a frame and other related components.

Updating financial and legal documents which involve multiple people at the same time may be a cumbersome and time-consuming process. For example, time consuming documents may be joint account forms, joint home loan forms, checks which involve multiple account holders, contracts, leases, purchase agreements, or any other legal and financial documents where updates may be frequent and may require consent of all respective account holders or signatories ("stakeholders").

All stakeholders/users in each document may be required to give their consent and approval to document changes and updates, as well as signatures (indicating consent and approval). In addition, tracing the authenticity of multi-user transactions or document changes may be difficult, as current systems may have to manually review whether respective stakeholders/users actually provided their consent or not to each change and the document as a whole.

A technology which can allow respective stakeholders/users to update and approve documents simultaneously by each user joining a live session, allowing each user to make changes and approve changes simultaneously, and recording the updates done by each user for future reference may be useful in streamlining the process of updating and approving documents. This technology may enhance customer experience and reduce fraud.

It would be desirable to provide distributed ledger technology that may be deployed through smart glasses to streamline collaborative document editing. It would be desirable to provide technology for adopting distributed ledger technology for use in connection with document editing and smart glasses. Accordingly, it is desirable to provide MULTIUSER SYNCHRONOUS CONCLAVE BLOCKCHAIN TECHNOLOGY.

SUMMARY OF THE DISCLOSURE

It is an object of this disclosure to provide apparatus and methods updating documents and other files with multiple user inputs at the same time using secure and private distributed ledger technology.

An apparatus for allowing a plurality of users to concurrently modify a document is provided. The apparatus may include a plurality of smart glasses. In this disclosure, a single pair of smart glasses may be referred to as a "smart glass". Each smart glass may belong to (or be assigned to) a single distinct user from the plurality of users: one user to one pair of smart glasses. In an embodiment, smart glasses may include virtual reality headsets or other virtual reality apparatus.

Each smart glass may include a frame, one or more lenses, a display, an input/output ("I/O") module, a network interface card ("NIC"), a processor, and a non-transitory memory. The display may be an LED (light emitting diode) or OLED (organic light emitting diode) display, or any other suitable display.

The non-transitory memory may store an operating system, a copy of a blockchain (or other type of distributed ledger), a blockchain controller, a blockchain partner controller, a change detection controller, and an approval and notification controller. The blockchain may include the document. The blockchain controller may be configured to operate the blockchain. The blockchain partner controller may be configured to communicate and interface with other smart glasses interacting with the blockchain. The change detection controller may be configured to detect a change made to the document by the distinct user. The approval and notification controller may be configured to request approval of the change from the users other than the distinct user, receive approval of the change from the users other than the distinct user, and communicate the received approval to all of the smart glasses.

The processor may be configured to operate, inter alia, the operating system, the blockchain controller, the blockchain partner controller, the change detection controller, the approval and notification controller, the NIC, and the I/O module.

In an embodiment, each smart glass included in the apparatus may include all of the above elements.

When a user makes a change to the document, the blockchain controller may record the change in the blockchain, as a change or proposed change. The approval and notification controller may communicate the change to the other smart glasses. The display in each smart glass may display the change, i.e., the document with the proposed change. The approval and notification controller may prompt each user other than the user who made the change to approve or disapprove of the change, and each user's approval or disapproval of the change may be communicated to the rest of the users. When the change is approved by the users, the document may be updated with the change (which may no longer be a proposed change) by the blockchain controller.

In an embodiment, the change detection controller may be configured to detect at least a first change and a second change. In an embodiment, the number of changes may be limited only by hardware and software limits. The processor may record the first change and the second change in the blockchain, as proposed changes. The processor, through the approval and notification controller, may communicate the first change and the second change to the plurality of smart glasses. Each display (one or more on each of the smart glasses) may display both the first and second change. The approval and notification controller may prompt each user to approve or disapprove of the first change and the second change (or other changes).

In an embodiment, the first change and the second change may be detected within a pre-determined time period of each other. For example, the changes may be made within nanoseconds of each other, in effect, they may be made concurrently or simultaneously. In an embodiment, multiple changes made be made concurrently or simultaneously.

In an embodiment, the display may display the first change in a first color and the second change in a second color. Other methods of differentiating changes may be used.

In an embodiment, the apparatus may include a server. The server may include a communication link, a processor, and non-transitory memory. The non-transitory memory may be configured to store, inter alia, a server operating system, a copy of the blockchain, a server blockchain controller configured to operate the blockchain, a server blockchain partner controller configured to interface with other devices interacting with the blockchain (such as smart glasses and other servers), a server change detection controller configured to detect a change made to the document, and a server approval and notification controller configured to receive approval of the change and notify other devices interacting with the blockchain of the approval. In an embodiment, the server may include a display. In an embodiment, the server may be configured to control the users joining the blockchain, by permitting additional users to join the existing users, or removing users at an appropriate time.

In an embodiment, the document may be finalized when all changes are approved or disapproved. As long as one or more changes remain pending approval or disapproval, the document may not be finalized. For example, a real estate contract may be finalized when all parties agree (or disagree) to all changes.

In an embodiment, the blockchain may be encrypted. In an embodiment, the blockchain or distributed ledger may be a conclave blockchain/ledger, where conclave refers to a private network or blockchain, as opposed to a public blockchain (e.g., Bitcoin). In an embodiment, each smart glass, and each server, may include an encryption controller.

In an embodiment, each smart glass may have an equal ability to change the document as every other smart glass in the plurality of smart glasses.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

A multi-user synchronous conclave distributed ledger/blockchain which may allow multiple smart glass users to enter into a distributed ledger/blockchain and edit documents is provided. Other input devices may be used as well in other embodiments, such as smartphones, tablets, and personal computers. Each of the users may be involved/be a stakeholder in a common financial account or common legal document. One user may begin a smart glass session to edit or approve the document in question. The remaining users may join that session. All users may be authenticated through any appropriate standard or unique authentication method. Biometric authentication may be used. The session may be live. The session may allow any of the users logged in to make live edits to the document. Each edit/update may be approved or denied by the other users, in real-time. Each edit/update may be recorded into the distributed ledger/blockchain using an immutable cryptographic signature.

The system may include a distributed ledger/blockchain controller, data storage, a change detection controller, and an approval and notification controller. Each controller may interact with each other and display updates to all users logged into a session/document any changes in real-time, as well as all approvals and rejections. Each controller may be located on a server, multiple servers, and/or a pair of smart glasses.

All of the logged in and authenticated smart glasses/users may record the document type, time, location, user info, user authentication, and approval/rejection of changes for any updates done by any user with smart glasses in the blockchain. Whenever any smart glass may perform a transaction, edit, or approval of a document, its record may be replicated by the block chain controller or other controller to that same smart glass and all other smart glasses/users in the blockchain/live session.

While a user is updating/editing a document, the change detection controller or other controller will show a live update of the changes done by each user to all other logged-in users. The user may make the updates/edits to the document through a peripheral device and an I/O controller. Each of the other users (who have the permission or authority) who are logged in to the blockchain/live session may be able to approve or reject any change done by all other users. After approval or rejection is received by the approval and notification controller (or other controller), the change may be recorded in the distributed ledger/blockchain and replicated on all glasses for future reference. If there is a need for users to check the updates done by other users and back track on the change, it may be available and may be retrieved from the blockchain/distributed ledger.

Multiple users can make changes to the document at the same time. A document merge controller may merge the changes into a unified whole.

In an embodiment, this technology may be used for other documents besides legal/financial documents, such as software development. For example, a group of developers may log into a session and develop and write code simultaneously with increased collaboration.

In an embodiment, the users may login to the appropriate blockchain session through the Internet. Alternatively, the users may login through a local intranet, avoiding the Internet and its associated security risks.

Distributed ledger technology may refer to a decentralized, tamperproof and transactional database. A distributed ledger provides a distributed, immutable, transparent, secure and auditable ledger of changes to a file or document. The distributed ledger can be consulted openly and fully, allowing access to all documents/changes that have occurred since the initialization of the system, and can be verified and collated by any entity with access at any time. The distributed ledger also stores information in a fashion that prevents alteration of the records stored in the distributed ledger.

A conclave distributed ledger/blockchain may refer to a private network or ledger that can only be accessed by users with the appropriate credentials, as opposed to a public blockchain, such as those used for some cryptocurrencies.

The distributed ledger may store information in linked segments, or a chain of "blocks." The linked blocks may collectively form a "blockchain." Each block may store a set of changes performed at a given time. Blocks are linked or chained to each other by a reference to the previous block. Each block in the distributed ledger is linked to the previously approved block using a cryptographic hash code of the previous block.

Security is accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

In this disclosure, proof of work and computationally intensive tasks may be unnecessary to add blocks to the blockchain, or add to the distributed ledger, as the disclosure deals with conclave (private) blockchains/ledgers. Any user may make a change to the document comprising the blockchain/ledger. The change, along with its metadata (user, time, location, etc.) may be sent as a new block to every other node/user in the blockchain/ledger. Every user/node may approve or disapprove of the change, and that record may be added as a new block to the blockchain/ledger along with its metadata. This may create an immutable record of every change and approval or disapproval. A malicious actor may not be able to modify any action taken in the past (change or approval/disapproval) as that modified action will not match the other nodes/users records of the blockchain/ledger. In addition, by limiting the nodes/users in a private blockchain, the users may be able to prevent malicious actors from gaining access at all, but that may depend on the strength of the authentication process used to access/login to the ledger/blockchain and any editing/approval session. The distributed nature of the block generation process may provide a tamperproof and auditable transactional database.

An apparatus for allowing a plurality of users to concurrently modify a document is provided. The apparatus may include a plurality of smart (eye)glasses. In this disclosure, a single pair of smart glasses may be referred to as a "smart glass". Each smart glass may belong to (or be assigned to) a single distinct user from the plurality of users. One user to one pair of smart glasses.

Each smart glass may include a frame, one or more lenses, a display, an input/output ("I/O") module, a network interface card ("NIC"), a processor, and a non-transitory memory. The I/O module may include any apparatus to manipulate any item appearing on the display, including a keyboard, mouse, hand gesture tracker, eye tracker, virtual keyboard, camera, radar, or any other appropriate apparatus. The I/O module may include a microphone, button(s) and/or touch screen which may accept user provided input. The I/O module may include one or more of a speaker for providing audio output and a video display for providing textual, audiovisual and/or graphical output. The display may be an LED (light emitting diode) or OLED (organic light emitting diode) display, or any other suitable display. The display may act as a 'heads-up' display, or a screen to reflect a projection. The display may be configured to only be visible and legible to the user when the user is wearing the smart glass. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display (hereinafter, "LCD") power must be supplied to the entire backlight even to illuminate just one pixel in the display. In contrast, an OLED display does not necessarily include a backlight. Furthermore, in an OLED display, preferably, only the illuminated pixel draws power. Therefore, power efficiency of OLED technology presents a possibility for designing payment instruments that provide enhanced security and functionality.

The non-transitory memory may store an operating system and standard applications, a copy of a blockchain (or other type of distributed ledger), a blockchain controller, a blockchain partner controller, a change detection controller, and an approval and notification controller, as well as other applications. Each smart glass may include some or all of these software applications in its own non-transitory memory.

The blockchain/ledger may include the document. In an embodiment, the blockchain/ledger may include an application to allow a user to modify the document, such as a word processing application or .pdf editor. In an embodiment, the modification application may be included with each smart glass as opposed to the blockchain/ledger.

The blockchain controller may be configured to operate the blockchain/ledger. The controller may allow the user to login, authenticate, download, open, and add to the data in the blockchain/ledger. In an embodiment, the blockchain controller may include an authentication ability. In an embodiment, the authentication process may be located elsewhere.

The blockchain partner controller may be configured to communicate and interface with other smart glasses interacting with the blockchain. The partner controller may communicate any changes or additions to the blockchain by a user to all other users/nodes in the blockchain. The partner controller may be able to push any new blocks/entries to all other nodes. In an embodiment, the partner controller may only be able to push new blocks/entries (changes or approvals/disapprovals, along with metadata) to other nodes/users while those other nodes/users are logged into the blockchain/ledger. In another embodiment, the partner controller may push new blocks/entries even while other nodes are offline, so that the new blocks/entries will be available as soon as the other nodes/users log into the blockchain/ledger.

The change detection controller may be configured to detect a change made to the document by the distinct user. For example, if the user is reading the document and wants to change a term, or add/remove a term, the user may do so through any appropriate application (word processor, .pdf reader etc.). The change detection controller may detect the change and send the change to the blockchain controller or approval and notification controller. In an embodiment, the change detection controller may also include metadata for the change (such as time, location, author, etc.) when it sends the change to the other applications. In an embodiment, the change detection controller may also detect when other users have made changes/edits to the document, by detecting when a new block/record is added to the blockchain/ledger. In an embodiment, the change detection controller may highlight any change with a unique color, font, underline, italics, bold, highlight or other notification so that the user may see the change.

The approval and notification controller may be configured to request approval of the change from the users other than the distinct user, receive approval of the change from the users other than the distinct user, and communicate the received approval to all of the smart glasses/nodes. Users may also disapprove of any change and the approval and notification controller may receive that disapproval and communicate the disapproval to all users.

The processor may be configured to operate, inter alia, the operating system, the blockchain controller, the blockchain partner controller, the change detection controller, the approval and notification controller, the NIC, and the I/O module. The processor may also be configured to operate any other application or device necessary to operate the apparatus. The processor may be a microprocessor or nanoprocessor. In an embodiment, multiple processors may be utilized.

Each smart glass/node may include a processor circuit. The processor circuit may control overall operation of the node and its associated components. Each node may include RAM, ROM, an input/output ("I/O") module and a non-transitory or non-volatile memory, as well as other components.

In an embodiment, each smart glass included in the apparatus may include all of the above elements.

When a user makes a change to the document, the blockchain controller or other controller may record the change in the blockchain, as a change or proposed change. The approval and notification controller may communicate the change to the other smart glasses. The display in each smart glass may display the change, i.e., the document with the proposed change. The approval and notification controller may prompt each user other than the user who made the change to approve or disapprove of the change, and each user's approval or disapproval of the change may be communicated to the rest of the users. When the change is approved by the users, the document may be updated with the change (which may no longer be a proposed change) by the blockchain controller.

In an embodiment, all users may join a single 'virtual' session together when changing/editing the document. Joining a single session may increase the speed at which documents may be changed/edited, as well as increase security. The session may take place over the Internet or 'cloud', or it may take place on a local intranet. When the users join a session together, they may make changes and approve changes in real-time and simultaneously.

In an embodiment, the change detection controller may be configured to detect at least a first change and a second change, or additional changes. In an embodiment, the number of changes may be limited only by hardware and software limits. The processor may record the first change and the second change in the blockchain, as proposed changes. The processor, through the approval and notification controller or other controller, may communicate the first change and the second change to the plurality of smart glasses. Each display (one or more on each of the smart glasses) may display both the first and second change. The approval and notification controller may prompt each user to approve or disapprove of the first change and the second change (or other changes).

In an embodiment, the first change may be made by a first distinct user, and the second change made by a second distinct user. In this embodiment, the change detection controller, blockchain controller, blockchain partner controller, and notification controller on the first user's smart glasses may control and disseminate the first change. And the change detection controller, blockchain controller, blockchain partner controller, and notification controller on the second user's smart glasses may control and disseminate the second change. Whichever user made a particular change, that user's smart glasses and components may control and disseminate that particular change, as well as receive approvals or disapprovals from the other users/nodes.

In an embodiment, the first change and the second change may be detected within a pre-determined time period of each other. For example, the changes may be made within nanoseconds of each other, in effect, they may be made concurrently or simultaneously. In an embodiment, multiple changes made be made concurrently or simultaneously. As each user's assigned smart glasses may control and disseminate/communicate changes made by that user, multiple users may be able to make changes simultaneously, as that user's own smart glasses may communicate with the other users' smart glasses/nodes.

In an embodiment, the display may display the first change in a first color and the second change in a second color. Other methods of differentiating changes, such as font color, font size, bold, italics, underline, and/or highlighting, may be used.

In an embodiment, the apparatus may include a server. The server may act as an additional node in addition to the smart glasses. The server may have some or all of the functionality of the smart glasses. The server may act as a destination for the final version of the document.

The server may include a communication link, a processor, and non-transitory memory. The non-transitory memory may be configured to store, inter alia, a server operating system, a copy of the blockchain, a server blockchain controller configured to operate the blockchain, a server blockchain partner controller configured to interface with other devices interacting with the blockchain (such as smart glasses and other servers), a server change detection controller configured to detect a change made to the document, and a server approval and notification controller configured to receive approval of the change and notify other devices interacting with the blockchain of the approval. These applications may be the same as, similar to, or different from equivalent applications in each smart glasses' non-transitory memory.

In an embodiment, the server may include a display. In an embodiment, the server may be configured to control the users joining the blockchain, by permitting additional users to join the existing users, or removing users at an appropriate time. In an embodiment, the server may 'host' a virtual session for the users to join. In an embodiment, the server may act as an authentication server. In an embodiment, the server may store the entire blockchain/ledger.

In an embodiment, the document may be finalized when all changes are approved or disapproved. As long as one or more changes remain pending approval or disapproval, the document may not be finalized. For example, a real estate contract may be finalized when all parties agree (or disagree) to all changes. A finalized document may be transmitted to an appropriate destination, such as a server, a financial institution, a legal office, a governmental office, or other appropriate destination. In an embodiment, the users may require unanimous consent to transmit the finalized document to a particular location, person, or entity.

In an embodiment, the blockchain may be encrypted. In an embodiment, the blockchain or distributed ledger may be a conclave blockchain/ledger, where conclave refers to a private network or blockchain, as opposed to a public blockchain (e.g., Bitcoin). In an embodiment, each smart glass, and each server, may include an encryption controller. In an embodiment, encryption may include authentication and authentication processes.

In an embodiment, each smart glass may have an equal ability to change the document as every other smart glass in the plurality of smart glasses. In other embodiments, a particular user/node or users/nodes may have more control over the blockchain/ledger than other users. These settings may be modified when the blockchain/ledger is created.

A method for multiple users to concurrently modify a document is provided. The method may include each user of the multiple users downloading a copy of a distributed ledger to a smart glass uniquely assigned to each of the multiple users. The distributed ledger may include the document. In an embodiment, the distributed ledger may be a conclave blockchain.

In an embodiment, the method may include each user joining a 'virtual' session or meeting. Each user may be authenticated before joining the session. Joining a session together may allow for simultaneous/concurrent editing and approval by all users within the session.

The method may include a change detection controller at a smart glass assigned to a distinct user of the multiple users, detecting a change made to the document by the distinct user. Each of the multiple users may have a smart glass assigned to them. The method may include a distributed ledger controller at the smart glass recording the change to the document in the distributed ledger. The method may include a distributed ledger partner controller at the smart glass communicating the change to the multiple users. The method may include each smart glass (one for each user) displaying the change. The method may include an approval and notification controller at the smart glass requesting approval or disapproval of the change from the multiple users. In an embodiment, the distinct user who made the change may also be asked for approval or disapproval. In an alternative embodiment, the distinct user who made the change may not be asked for approval or disapproval.

The method may include receiving at the approval and notification controller of the smart glass the approval or disapproval of the change from the multiple users and communicating that approval or disapproval with all users. As soon as each user has approved or disapproved the change, that approval or disapproval may be sent to the blockchain and communicated with all other users. The method may include updating the document (i.e., the distributed ledger or blockchain) with the change when all of the users have approved the change through the distributed ledger controller.

In an embodiment, the method may include detecting at the change detection controller, a first change and a second change, or additional changes. The amount of changes may be limited by software or hardware capabilities. The first change and the second change may be detected within a pre-determined time period of each other, e.g., a microsecond. Effectively, the change detection controller may be able to handle multiple changes simultaneously or concurrently, allowing for concurrent modification of the document by multiple users. In an embodiment, the simultaneous/concurrent editing and approval of changes may take place within a virtual live session that each user may join. For example, each user within the session may see the document on their smart glass, as well as real-time changes and approvals to the document from the other users. There may be a lag between a user's actual input of a change or approval and its appearance on the remaining users' smart glasses. The lag may be determined by hardware and network capacity and capabilities.

In an embodiment, the method may include the distributed ledger controller recording the first change and the second change to the document in the distributed ledger. The method may include the distributed ledger partner controller communicating the first change and the second change to the multiple users. The changes may be displayed on the displays of each smart glass. The method may include the approval and notification controller requesting approval or disapproval of the first change and the second change from the multiple users. The method may include the approval and notification controller receiving the approval or disapproval of the first change and the second change from the multiple users. The method may include communicating the approval or disapproval of the first change and the second change to the multiple users. When the multiple users approve the first change or the second change, the distributed ledger controller may update the document with the approved change.

In an embodiment, the method may include displaying the first change in a first color and the second change in a second color, or other changes in various colors. Other display differentiating methods, such as inter alia, italics, underlines, bold, highlighting, font color, or a combination thereof, may be used.

A method for two or more users to concurrently modify a document is provided. The method may include each user joining a conclave blockchain (or other form of distributed ledger). The blockchain may include the document. The method may include a central server assigning each user a unique login to the blockchain.

In an embodiment, each user who has joined the conclave blockchain may also join a virtual live session to edit/approve changes to the document.

When the user logs into the blockchain (or the live session), the user may become an active user. The method may include downloading a copy of the blockchain to a smart glass uniquely assigned to each user. Each user may have their own smart glass.

The method may include a change detection controller detecting a first change made to the document by a first active user and a second change to the document made by a second active user. The change detection controller may be located at each smart glass. For example, the smart glass assigned to the first active user may include a change detection controller which may detect changes made by the first active user. Similarly, the smart glass assigned to the second active user may include a change detection controller which may detect changes made by the second active user. The number of changes may be limited by hardware or software considerations. The first change and the second change may be made simultaneously or concurrently.

The method may include recording in the blockchain the first change and the second change, by a distributed ledger controller. The method may include a distributed ledger partner controller communicating the first change and the second change to all of the users. The method may include displaying the first change and the second change on each smart glass, i.e., displaying the changes to each user. The method may include an approval and notification controller requesting approval or disapproval from each user of the first change and the second change. The method may include the approval and notification controller receiving the approval or disapproval from each user of the first change and the second change. The method may include communicating the approval or disapproval to each user. The method may include updating the document with the approved first or second change when each user approves the first change or second change. The updating may be performed by the distributed ledger controller.

In an embodiment, the first active user and second active user may be concurrently logged into the blockchain and concurrently making changes to the document.

In an embodiment, the document may be finalized when all changes are approved or disapproved.

Apparatus and methods described herein allow multiple users to form and enter into a distributed ledger network to simultaneously modify and complete documents through smart glasses or other user devices. Each user's smart glasses may be a node on the distributed ledger network. Each node may store an immutable record of all changes to the document proposed and approved or disapproved (along with metadata) initiated by any of the other nodes on the distributed ledger network. The record may be stored locally on each node using an immutable cryptographic signature. Adding and removing of nodes (i.e., users) to/from the distributed ledger network may be accomplished using any appropriate method at the creation of the network. For example, once the document is initially created, the author may invite the appropriate other users to join the network in order to change or approve/disapprove the document. In an embodiment, once the network is created, no new nodes may be added.

Nodes on the distributed ledger network may include an embedded network interface card ("NIC"). The NIC may implement protocols for wireless communication. The NIC may provide Wi-Fi, Near Filed Communication ("NFC"), cellular (including 5g), Bluetooth or any other suitable mode of wireless communication. Wi-Fi may include passive Wi-Fi having lower power consumption than typical Wi-Fi. The NIC may have a thickness that is not greater than 0.8 mm. Such a NIC may be referred to herein as a nano-NIC ("nNIC").

Apparatus and methods may include creating a distributed ledger network linking multiple smart glasses (each a node on the network), each smart glass belonging to or assigned to a distinct user, so that users may not share smart glasses. All nodes on the distributed ledger network may store a local copy of all changes and approvals/disapprovals made by each node.

All nodes on the network may include hardware for establishing network connection and data exchange. Whenever any node initiates a change, an immutable record of that change may be replicated to the initiating node and all other nodes on the distributed ledger network. Because prior records are stored locally by each node, each node has the capability to verify attributes of past changes, compare past attributes to current changes and detect potentially anomalous activity.

Each node may have the ability to independently detect potentially anomalous activity and alert other nodes in the distributed ledger network in response to detecting such activity. As part of a consensus mechanism, other nodes on a network may block potentially fraudulent changes before they are recorded on the blockchain or any other distributed ledger. A consensus mechanism provides a method for nodes to come to an agreement on what to or what not to accept as a valid transaction on the distributed ledger. Illustrative consensus mechanisms may include Proof-of-work, Proof-of-stake, Proof-of-activity, Practical Byzantine Fault Tolerance and Delegated Byzantine Fault Tolerance.

The distributed ledger network may require that each change proposed by a node must be approved/rejected by all nodes in the network before the change may be approved for modifying the document. Distributed ledger transaction data may be stored in a central, remote location, such as a central server. The distributed ledger data may be stored locally by each node/smart glass. The distributed ledger network may require all nodes in the network come to a unanimous consensus whether to approve or reject a change to the document. In some embodiments, consensus rules that do not require uniform consensus may be pre-programmed into the distributed ledger network.

A distributed ledger node application may provide software that implements rules for interacting with other nodes on a blockchain or any other distributed ledger technology ("DLT"). For example, a distributed ledger node application may control implementation of cryptographic and consensus mechanisms for how new blocks (e.g., proposed changes to a document) are added to a blockchain or other immutable record of historical interactions. The distributed ledger node application may control application of private/public-key cryptography and generation/verification of cryptographic hash values.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

Figure 1:
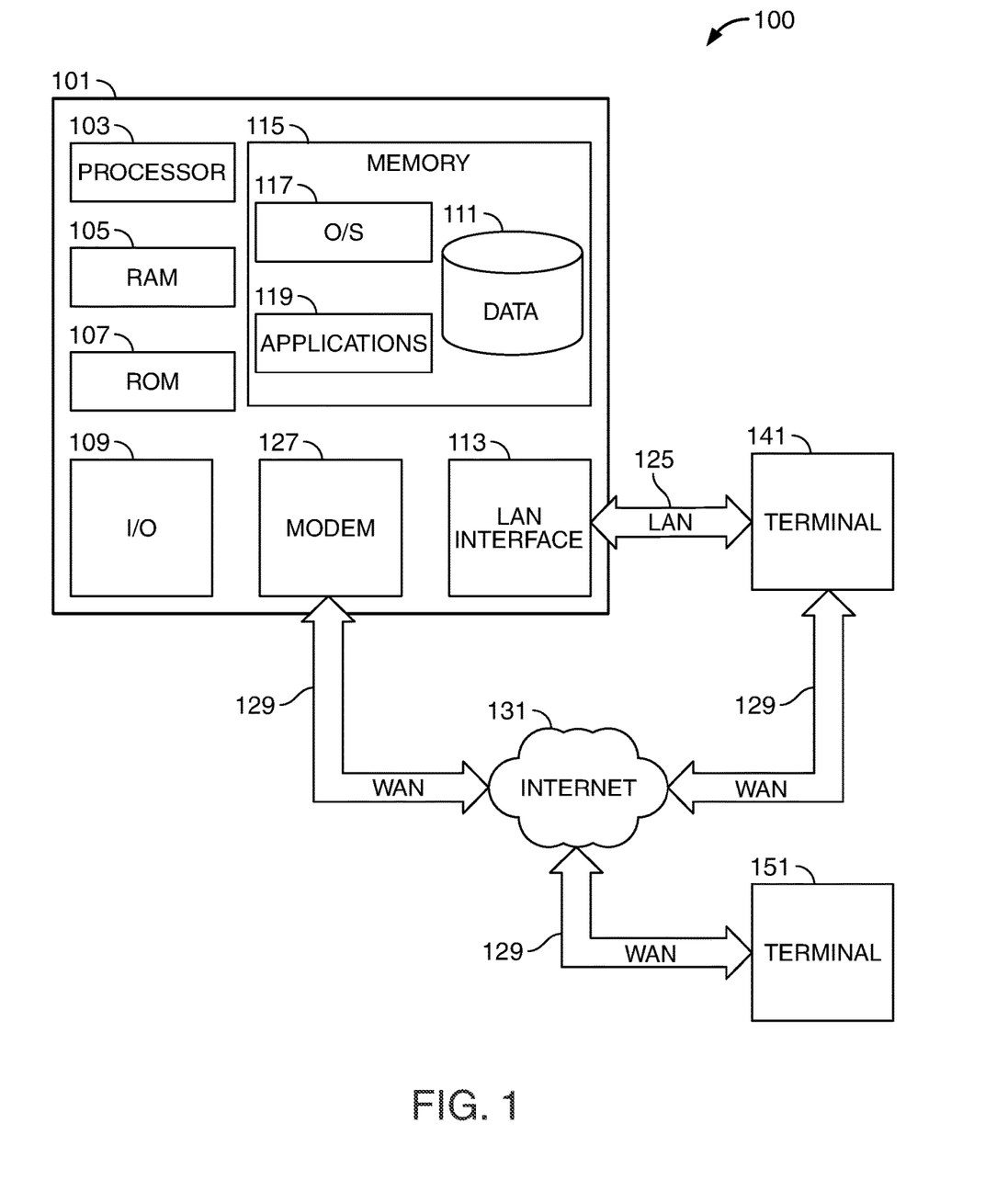
FIG. 1 shows illustrative apparatus in accordance with principles of the disclosure.

FIG. 1 is a block diagram that illustrates a computing device 100 (alternatively referred to herein as a "smart glasses") that may be used in accordance with the principles of the invention. The smart glasses 101 may have a processor 103 for controlling overall operation of the smart glasses and its associated components, including RAM 105, ROM 107, input/output ("I/O") module 109, and memory 115.

I/O module 109 may include a microphone, keypad, touchscreen, microphone, camera/eye tracker, stylus, or other apparatus through which a user of device 101 may provide input and may also include one or more of a speaker for providing audio output and a video display device for providing textual, audiovisual and/or graphical output. Software may be stored within memory 115 and/or other storage (not shown) to provide instructions to processor 103 for enabling smart glasses 101 to perform various functions, such as joining a distributed ledger session and modifying/changing a document. For example, memory 115 may store software used by smart glasses 101, such as an operating system 117, application programs 119, and an associated database.

Alternatively, some or all of computer executable instructions of smart glasses 101 may be embodied in hardware or firmware (not shown).

Smart glasses 101 may operate in a networked environment supporting connections to one or more remote computers, such as terminals 141 and 151. Terminals 141 and 151 may be computers, servers, or other smart glasses that include many or all of the elements described above relative to smart glasses 101. The network connections depicted in FIG. 1 include a local area network (LAN) 125 and a wide area network (WAN) 129 but may also include other networks.

When used in a LAN networking environment, computer 101 is connected to LAN 125 through a network interface or adapter 113.

When used in a WAN networking environment, smart glasses 101 may include a modem 127 or other means for establishing communications over WAN 129, such as Internet 131. Bluetooth, cellular, NFC or other communication protocols may also be used.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages. It is anticipated that the apparatus may be used to join a distributed ledger network/blockchain and download/manipulate the document(s) included in the ledger/blockchain.

Additionally, application program 119, which may be used by smart glasses 101, may include computer executable instructions for invoking user functionality related to communication, such as email, short message service (SMS), authentication services and voice input and speech recognition applications.

Smart glasses 101 and/or terminals 141 or 151 may also be referred to as nodes on the distributed ledger network and may be mobile terminals including various other components, such as a battery, speaker, and antennas (not shown). Terminal 151 and/or terminal 141 may be portable devices such as smart glasses or any other suitable device for receiving, storing, transmitting and/or displaying relevant information, such as interacting with the distributed ledger/blockchain and other nodes on the distributed ledger network.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform various functions such as joining a distributed ledger network, downloading the ledger, modifying the document(s) within the ledger, requesting approval/disapproval, sharing the edits, communicating with other nodes on the network, and/or performing any other suitable tasks.

In addition to smart glasses, the invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
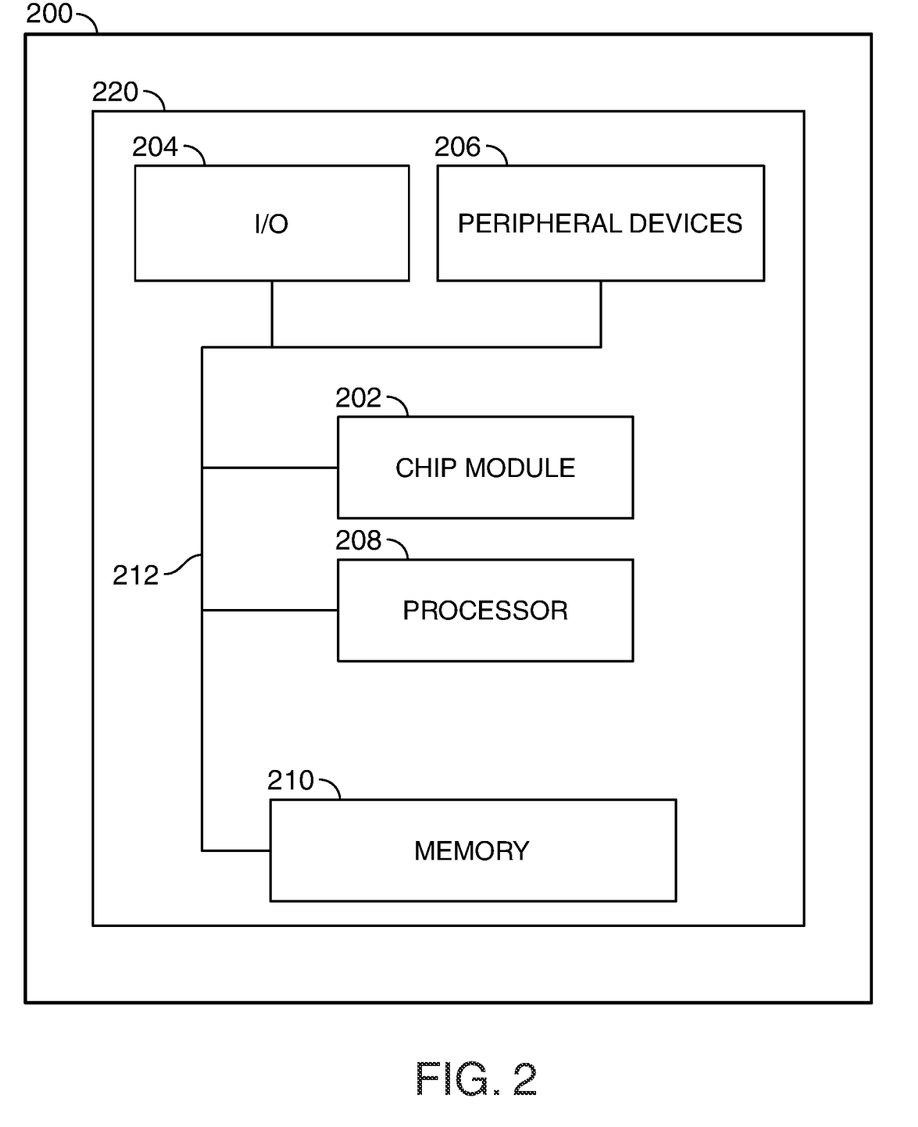
FIG. 2 shows illustrative apparatus in accordance with principles of the disclosure.

FIG. 2 shows an illustrative apparatus 200 that may be configured in accordance with the principles of the invention.

Apparatus 200 may be a computing machine, such as a pair of smart glasses. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may run any software application or applications described herein; and machine-readable memory 210.

Machine-readable memory 210 may be configured to store in machine-readable data structures: data, programming functions, units of programming code associated with the programming functions and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
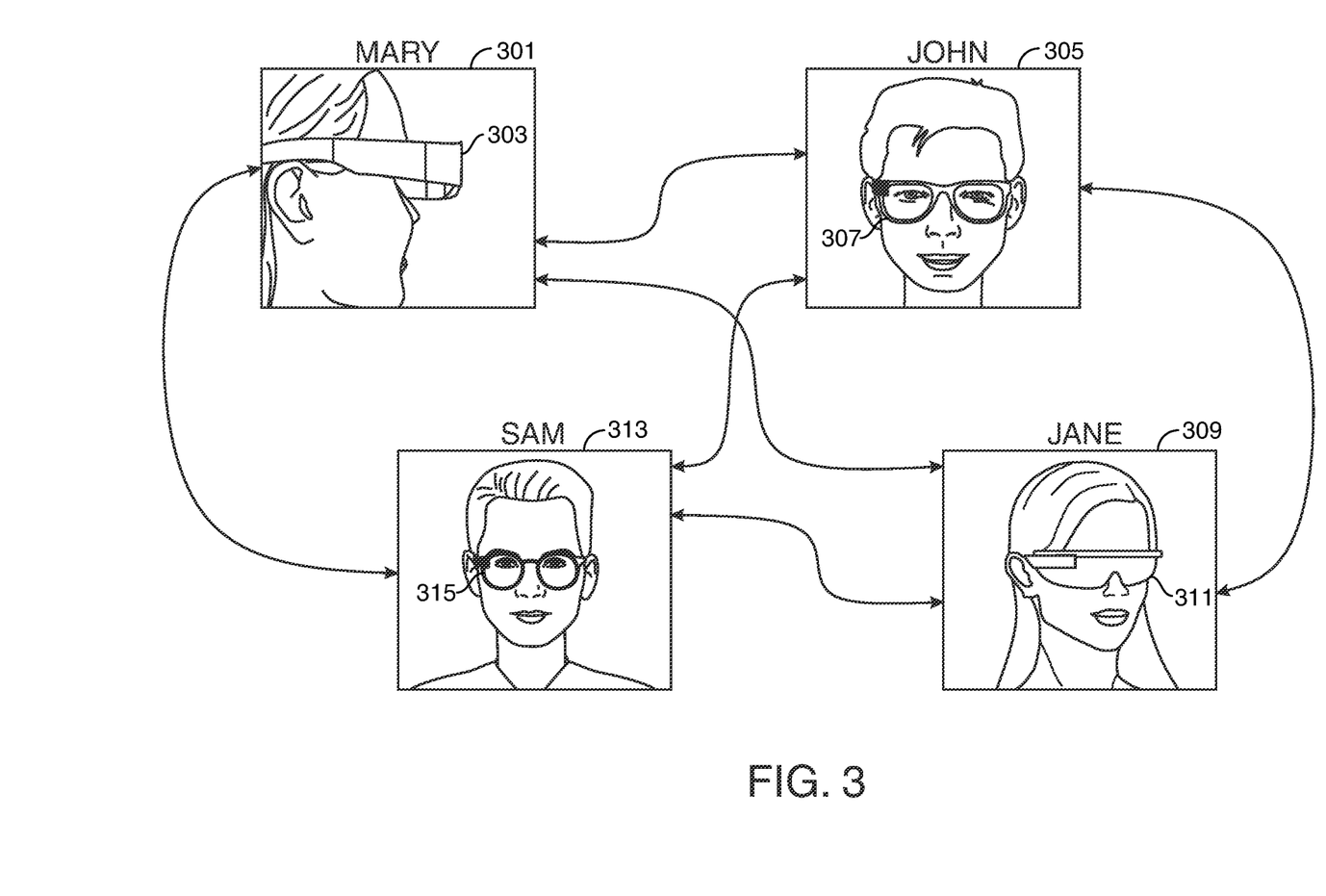
FIG. 3 shows an illustrative network in accordance with the principles of the disclosure.

FIG. 3 shows an illustrative network in accordance with the principles of the disclosure. A distributed ledger/blockchain network may include two or more nodes, such as smart glasses and a server. Each node may have a user interacting with the node, and each node may communicate with every other node. For example, user 301 may wear smart glasses 303, user 305 may wear smart glasses 307, user 309 may wear smart glasses 311, and user 313 may wear smart glasses 315. Each of the users may communicate with every other user through their respective nodes/smart glasses. Each of the nodes/smart glasses may communicate with every other node/pair of smart glasses. Communication may be in real time and simultaneous. Communication may lag depending on the type of network connection and physical distance between nodes. Communication may not be limited to line of sight.

Figure 4:
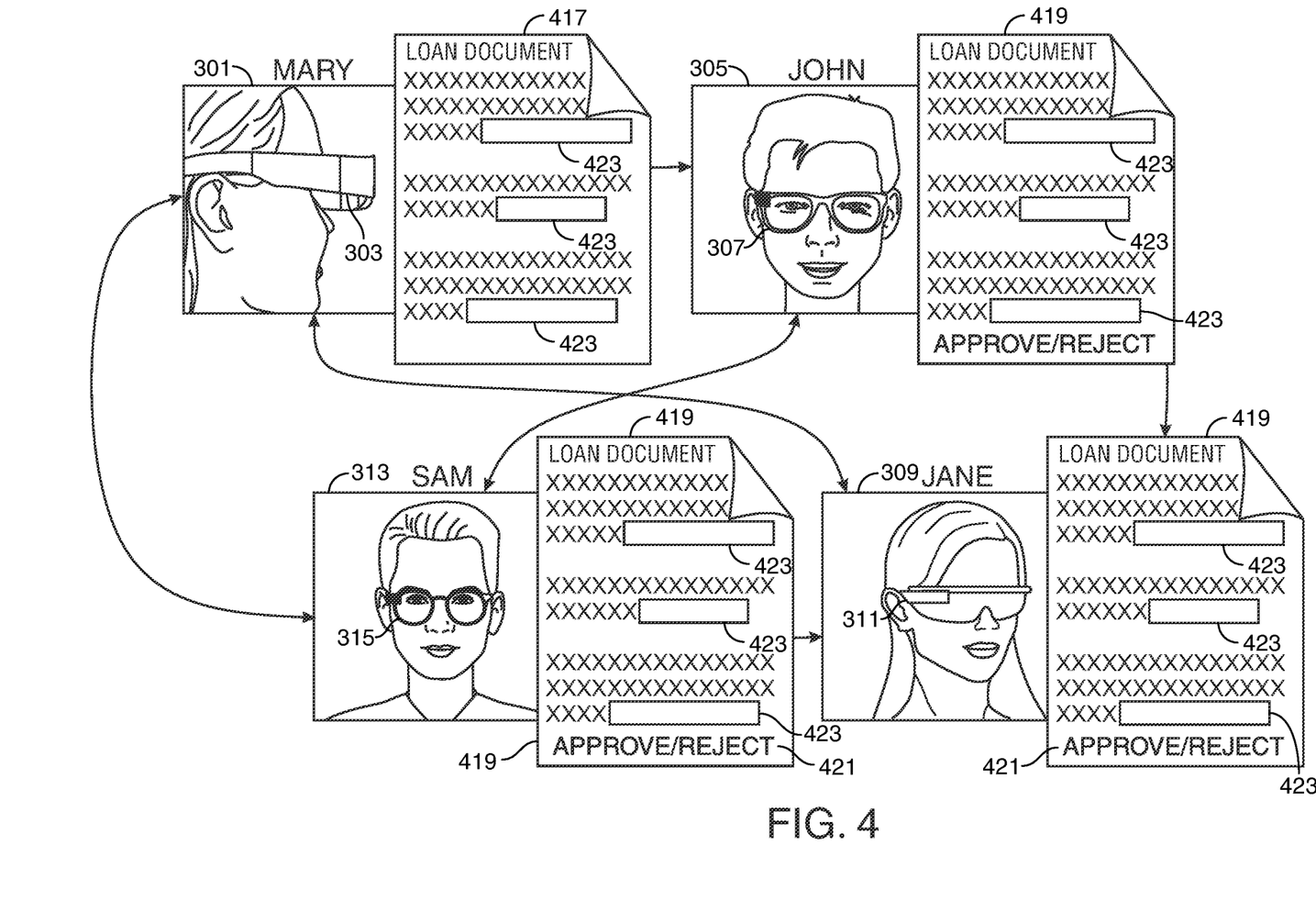
FIG. 4 shows an illustrative state of the network shown in FIG. 3.

FIG. 4 shows an illustrative state of the network shown in FIG. 3. For example, users 301, 305, 309, and 313 may communicate through respective smart glasses/nodes 303, 307, 311, and 315. The users may join a collaborative session to edit and complete an exemplary document 417. User 301 may make changes 423 to document 417. Those changes 423 may be communicated to the other users 305, 309, and 313 though nodes 307, 311, and 315. Each of the users may be requested to approve/disapprove 421 of changes 423, and their approval/disapproval may be communicated to the other nodes. Any user 301, 305, 309, and 313 may make changes and the remaining users may be requested to approver/disapprove of the changes. Changes may be made simultaneously by multiple users/nodes and each change may be identified by the author along with other metadata (not shown).

Figure 5:
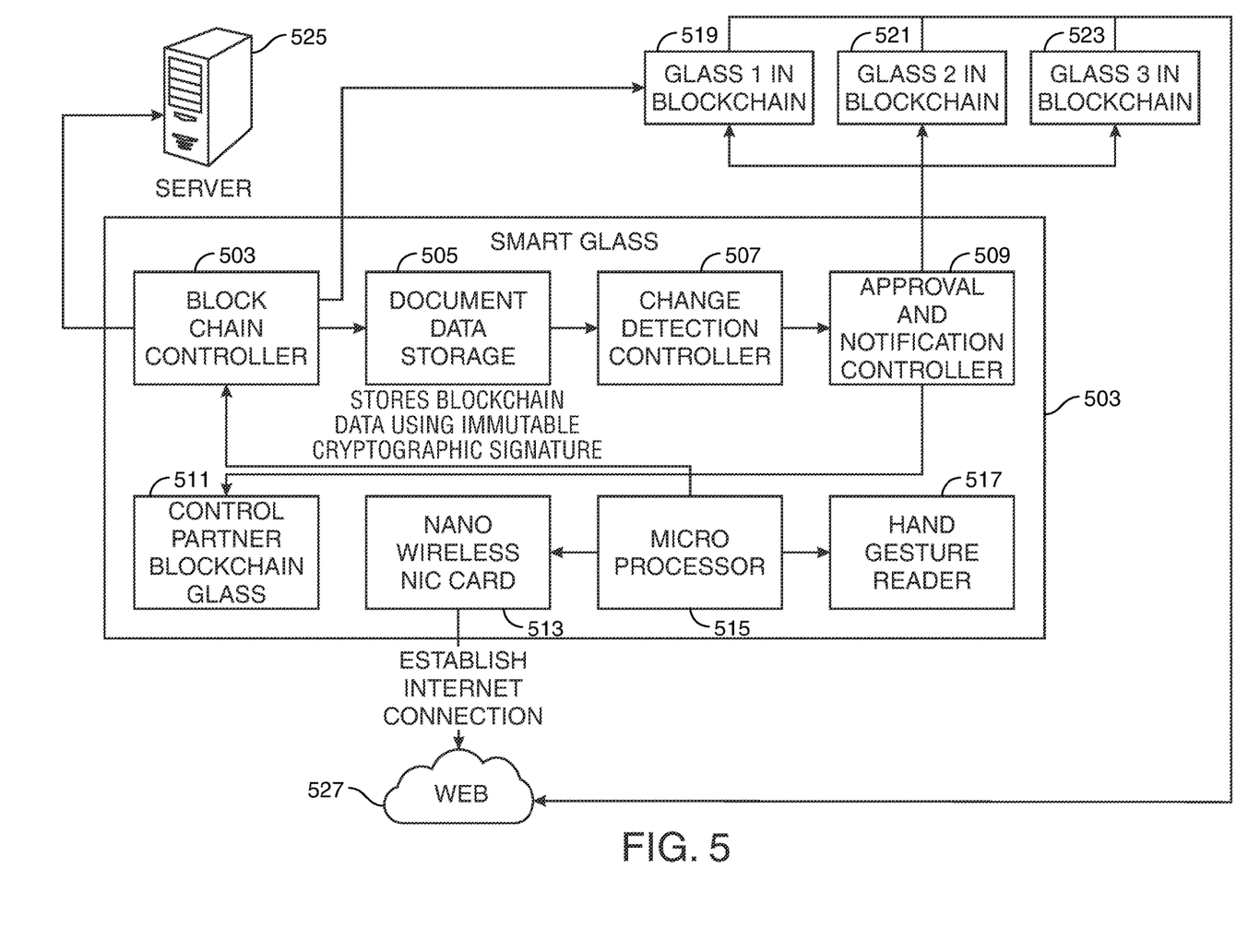
FIG. 5 shows an illustrative system in accordance with the principles of the disclosure.

FIG. 5 shows illustrative system components of a smart glass 501 or other node on a distributed ledger network and associated process flow 500. Process flow 500 may begin with activation of distributed ledger/blockchain controller 503. Distributed ledger controller 503 may include an instance of a distributed ledger node application. Distributed ledger controller 503 may be activated in response to receiving an instruction via nNIC 513. Distributed ledger controller 503 may receive the instruction via internet access to web 525.

Distributed ledger controller 503 may access document and data storage ("DDS") 505. DDS 505 may include change records that are recorded in immutable format. DDS 505 may store historical records as well as the document to be modified or approved/disapproved. Change detection controller ("CDC") 507 may determine whether a change has been made to the document stored in DDS 505.

If CDC 507 determines that a change has been made to the document, approval and notification controller 509 may generate and transmit the change(s) and metadata along with a request to approve/disapprove to other smart glasses in the network such as smart glasses 519, 521, and 523. Smart glasses 519, 521, and 523 may receive information via internet access to web 527. Smart glasses 519, 521, and 523 may have all of the same components and applications as smart glass 501. Users of smart glasses 519, 521, and 523 may be prompted to approve or reject the proposed change(s).

Notification controller 509 may inform all of the users of smart glasses 501, 519, 521, and 523 whether a change has been approved or rejected.

Notifications sent by notification controller 509 may be presented on a display (not shown) on each smart glass. The display may include OLED technology. Microprocessor 515 may provide processing power that controls over operation of the smart glass, including operation of BCC 503, CDC 507, notification controller 509, and hand gesture reader 517 (or other I/O device). Control partner distributed ledger/blockchain module ("CPDLM") 511 provides functionality that determines whether to add/remove changes to/from a document in the distributed ledger network and associated distributed ledger/blockchain. Once a document is approved, it may be transmitted to a server 525 or other location for further action.

Figure 6:
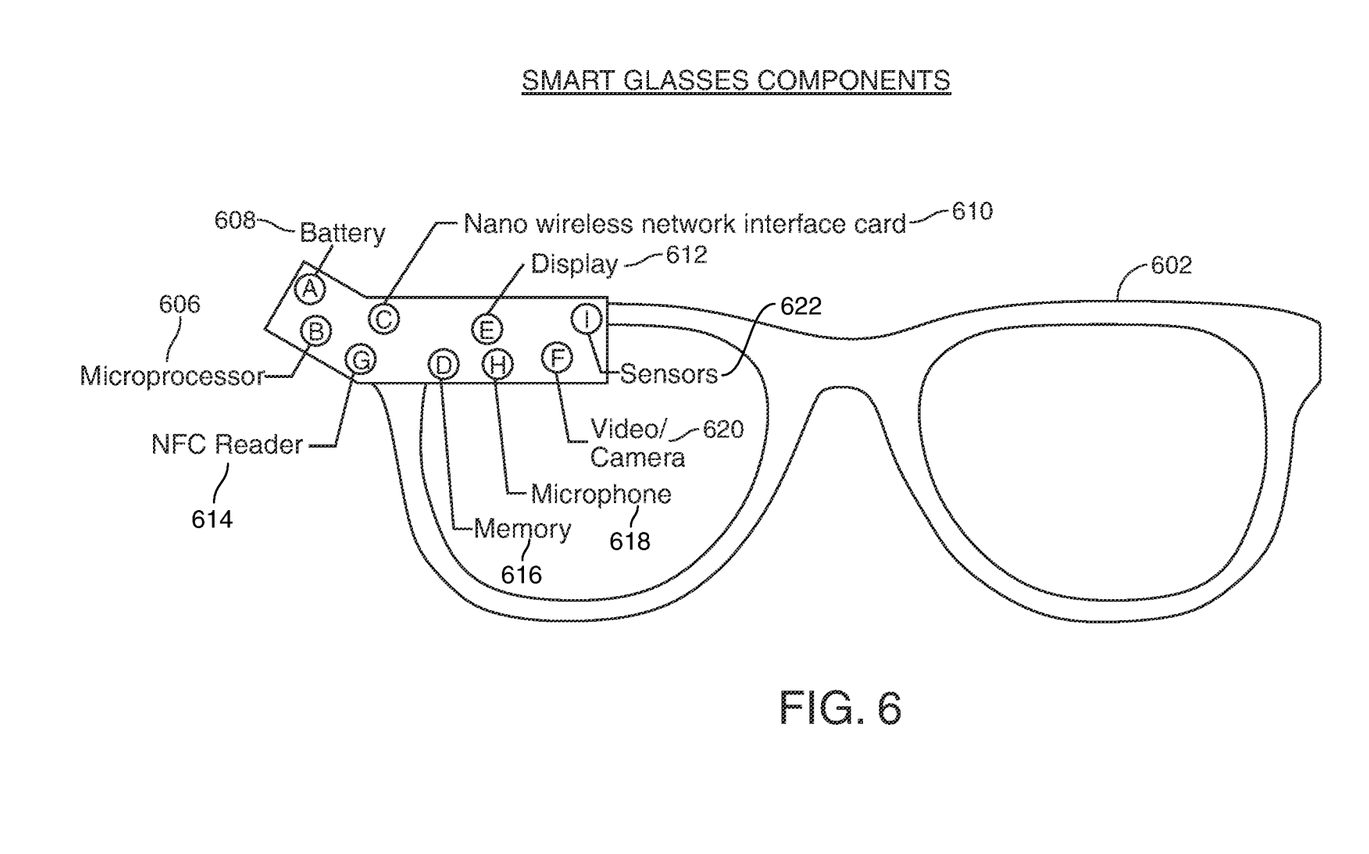
FIG. 6 shows an illustrative apparatus in accordance with the principles of the disclosure.

FIG. 6 shows illustrative smart glasses 602 in accordance with principles of the invention. Illustrative smart glasses 602 may include a plurality of hardware embedded in smart glasses 602. The plurality of hardware may include one, two, some, or all of hardware A-I illustrated in FIG. 6, and, in some embodiments, additional hardware not shown in FIG. 6.

The plurality of hardware may include battery 608 shown at A, microprocessor 606 shown at B, NFC reader 614 shown at G, nano wireless network interface card 610 shown at C, display 612 shown at E, sensors 622 shown at I, video/camera 620 shown at F, microphone 618 shown at H, and memory 616 shown at D. The functionalities of each of the aforementioned hardware elements is described in greater detail herein.

Battery 608 may power the other components of smart glasses 602, such as the display and the microprocessor. Microprocessor 606 may execute processing within smart glasses 602, such as the various controllers and applications described herein. Nano wireless NIC 610 may establish communication with a nearby wireless network. The wireless network may be used to communicate with other nodes on the network or servers. Display 612 may display software-based displays to the user, such as augmented reality displays. Sensors 622 may monitor various sensor inputs to smart glasses 302.

Video camera 620 may be operable to record a video or transmit a video. The video may record the view of smart glasses 602, including any changes made to a document in a distributed ledger/blockchain. The video may be stored in memory 616. The video may be streamed to other nodes on the network and not stored in database 316. The video may include multiple frames.

Figure 7:
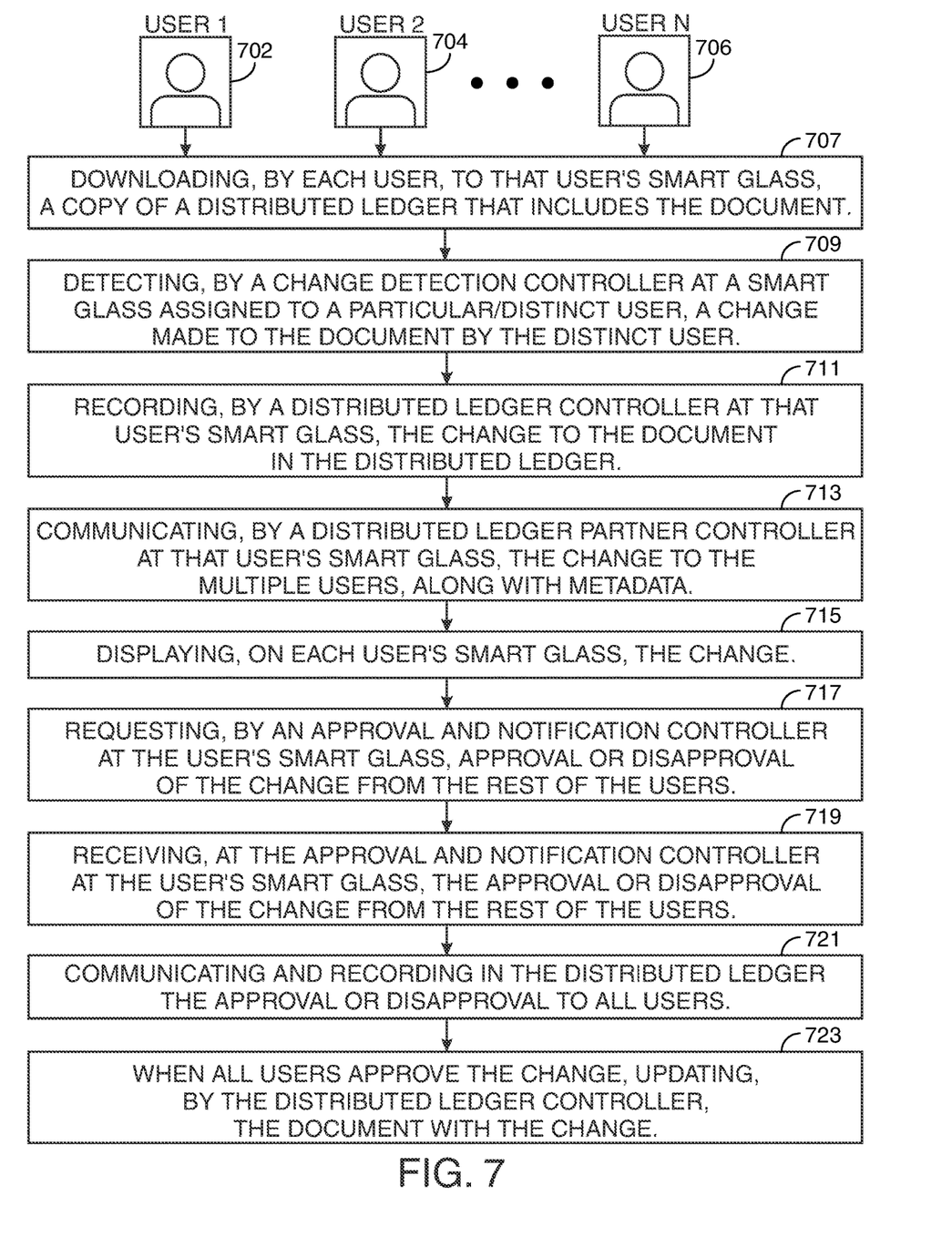
FIG. 7 shows an illustrative flow chart in accordance with principles of the disclosure.

FIG. 7 shows an illustrative flowchart in accordance with principles of the invention. Methods may include some or all of the method steps numbered 707 through 723. Methods may include the steps illustrated in FIG. 7 in an order different from the illustrated order. The illustrative method shown in FIG. 7 may include one or more steps performed in other figures or described herein. Steps 707 through 723 may be performed on the apparatus shown in FIGS. 1-6, or other apparatus.

At step 707, each of the users 702 (user 1), 704 (user 2) and 706 (user N) may download, to that user's uniquely assigned smart glass (one smart glass to one user), a copy of a distributed ledger that includes the document the users desire to modify or approve.

At step 709, a change detection controller at one of the smart glasses assigned to a particular/distinct user may detect a change made to the document by the distinct user the smart glass is assigned to. The user may make a change to the document through any appropriate editing program, such as a word processing program or .pdf editor.

At step 711, a distributed ledger controller at that user's (the user who made the change to the document) smart glass may record the change to the document in the distributed ledger.

At step 713, a distributed ledger partner controller at that user's smart glass may communicate the change to the multiple users, along with metadata, such as author, time, and place of the change. At step 715, each user's smart glass may display the change.

At step 717, an approval and notification controller at that user's smart glass may request approval or disapproval of the change from the rest of the users. In an embodiment, the approval and notification controller may request approval from the author as well as the remaining users.

At step 719, the approval and notification controller at the user's smart glass may receive the approval or disapproval of the change from the rest of the users. At step 721, the approval and notification controller may communicate with all of the users and record in the distributed ledger the approval or disapproval to all users. In various embodiments, other controllers may communicate or record the approval or disapproval. And at step 723, when all users approve the change, the distributed ledger controller of the user's smart glass who made the change may update the document (and the ledger) with the change.

Figure 8:
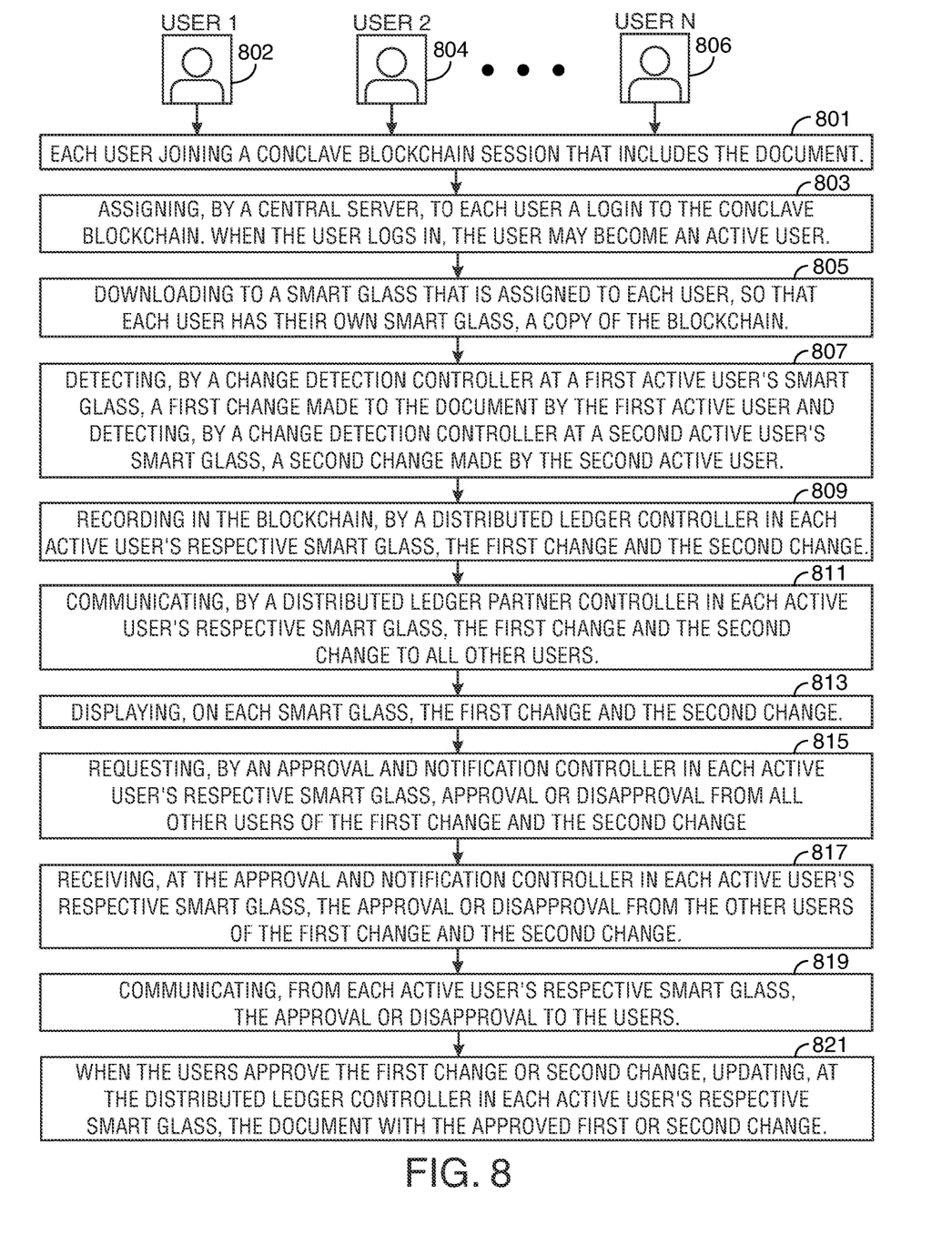
FIG. 8 shows an illustrative flow chart in accordance with principles of the disclosure.

FIG. 8 shows an illustrative flowchart in accordance with principles of the invention. Methods may include some or all of the method steps odd-numbered 821 through 821. Methods may include the steps illustrated in FIG. 8 in an order different from the illustrated order. The illustrative method shown in FIG. 8 may include one or more steps performed in other figures or described herein. Steps 801 through 821 may be performed on the apparatus shown in FIGS. 1-6, or other apparatus.

At step 801, each of the users 802 (user 1), 804 (user 2), and 806 (user N) may join a conclave blockchain/distributed ledger session that includes the document. Each user must also join the blockchain to begin with as it is a conclave (private, non-public) blockchain/distributed ledger. At step 803, a central server may assign to each user a login to the conclave blockchain/ledger. When the user logs in and joins the session, the user may become an active user. At step 805, each user or each active user may downloading to a smart glass that is assigned to each user (so that each user has their own smart glass) a copy of the blockchain/document.

At step 807, a change detection controller at a first active user's smart glass may detect a first change made to the document by the first active user, and a change detection controller at a second active user's smart glass may detect a second change made by the second active user. Each change detection controller may only detect a change made at the smart glass of which the change detection controller is a part. Further changes beyond the first and second may be made as well by other users. The changes may be made simultaneously.

At step 809, a distributed ledger controller in each active user's respective smart glass may record in the blockchain the first change and the second change. For example, the first active user's smart glass' distributed ledger controller may record the first change and the second active user's smart glass' distributed ledger controller may record the second change.

At step 811, a distributed ledger partner controller in each active user's respective smart glass may communicate the first change and the second change, respectively, to all other users. For example, the first active user's smart glass' distributed ledger partner controller may communicate the first change and the second active user's smart glass' distributed ledger partner controller may communicate the second change. In an embodiment, instead of the distributed ledger partner controller communicating the change, the approval and notification controller may communicate the change.

At step 813, each smart glass may display the first change and the second change. At step 815, an approval and notification controller in each active user's respective smart glass may request approval or disapproval from all other users of the first change and the second change. The request may be displayed on each smart glass. The request may include a clickable area for the user to select approve and another area to select disapprove or reject.

At step 817, the approval and notification controller in each active user's respective smart glass may receive the approval or disapproval from the other users of the first change and the second change, and at step 819 may communicate that approval or disapproval to all of the other users. The approval or disapproval may also be recorded in the distributed ledger.

At step 821, when all of the users approve the first change or second change, the distributed ledger controller in each active user's respective smart glass may update the document with the approved first or second change. This update may also update the distributed ledger. In an embodiment, only a majority of the users may be required to approve or disapprove of the change. In other embodiments, the number of users required for approval may be adjusted as necessary.

Thus, apparatus and methods for MULTIUSER SYNCHRONOUS CONCLAVE BLOCKCHAIN TECHNOLOGY have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An apparatus for allowing a plurality of users to concurrently modify an editable legal document in real-time, comprising:
 a plurality of smart glasses, each smart glass assigned to a distinct user of the plurality of users and comprising:
  a display;
  an input/output ("I/O") module;
  a network interface card ("NIC");
  a non-transitory memory configured to store at least:
   an operating system;
   a copy of a blockchain comprising the document;
   a blockchain controller configured to operate the blockchain;
   a blockchain partner controller configured to interface with other smart glasses interacting with the blockchain;
   a change detection controller configured to detect a change made to the document by one active user of the plurality of users; and
   an approval and notification controller configured to:
    request approval of the change from the users other than the one active user;
    receive approval of the change from the users other than the one active user; and
    communicate the received approval to the plurality of smart glasses; and
  a processor configured to operate at least:
   the operating system,
   the blockchain controller;
   the blockchain partner controller;
   the change detection controller;
   the approval and notification controller;
   the NIC; and
   the I/O module;
 wherein each user of the plurality of users:
  is assigned a login to the conclave blockchain; and
  when the user logs in to the conclave blockchain, the user becomes an active user;
 wherein when the change is made to the document by the one active user from the plurality of users:
  the blockchain controller records the change in the blockchain;
  the approval and notification controller communicates the change to the plurality of smart glasses;

the display in each smart glass displays the change;
the approval and notification controller prompts each user other than the one active user who made the change to approve or disapprove of the change;
each user's approval or disapproval is communicated to the plurality of users; and
when the change is approved by the plurality of users, the document is updated with the change by the blockchain controller to create an updated document; and
wherein each smart glass has an equal ability to change the document as every other smart glass in the plurality of smart glasses.

2. The apparatus of claim 1 wherein the change detection controller is configured to detect a first change and a second change.

3. The apparatus of claim 2 wherein:
the processor records the first change and the second change in the blockchain;
the processor communicates the first change and the second change to the plurality of smart glasses;
the display displays the first change and the second change; and
the approval and notification controller prompts each user to approve or disapprove of the first change and the second change.

4. The apparatus of claim 2 wherein the first change and the second change are detected within a pre-determined time period of each other.

5. The apparatus of claim 3 wherein the display displays the first change in a first color and the second change in a second color.

6. The apparatus of claim 1 further comprising a server, the server comprising:
a communication link;
a processor; and
non-transitory memory configured to store at least:
a server operating system;
a copy of the blockchain;
a server blockchain controller configured to operate the blockchain;
a server blockchain partner controller configured to interface with other devices interacting with the blockchain;
a server change detection controller configured to detect a change made to the document; and
a server approval and notification controller configured to receive approval of the change and notify other devices interacting with the blockchain of the approval.

7. The apparatus of claim 1 wherein the document is finalized when all changes are approved or disapproved.

8. The apparatus of claim 1 wherein the blockchain is encrypted.

9. The apparatus of claim 6 wherein the server is configured to permit additional users to join the plurality of users.

10. The apparatus of claim 1 further comprising an encryption controller stored in the non-transitory memory.

11. A method for multiple users to concurrently modify an editable legal document in real-time, the method comprising:
downloading, by each user of the multiple users to a smart glass uniquely assigned to each of the multiple users, a copy of a distributed ledger comprising the document;
detecting, by a change detection controller at a smart glass assigned to an active user of the multiple users, a change made to the document by the distinct user;
recording, by a distributed ledger controller at the smart glass, the change to the document by the active user in the distributed ledger;
communicating, by a distributed ledger partner controller at the smart glass, the change to the multiple users;
displaying, on each smart glass, the change;
requesting, by an approval and notification controller at the smart glass, approval or disapproval of the change from the multiple users;
receiving, at the approval and notification controller at the smart glass, the approval or disapproval of the change from the multiple users;
communicating the approval or disapproval to the multiple users; and
when the multiple users approve the change, updating, at the distributed ledger controller, the document with the change;
wherein each smart glass has an equal ability to change the document as every other smart glass assigned to each of the multiple users.

12. The method of claim 11 further comprising detecting, at the change detection controller, a first change and a second change.

13. The method of claim 12 further comprising:
recording, by the distributed ledger controller, the first change and the second change to the document in the distributed ledger;
communicating, by the distributed ledger partner controller, the first change and the second change to the multiple users;
displaying, on each smart glass, the first change and the second change;
requesting, by the approval and notification controller, approval or disapproval of the first change and the second change from the multiple users;
receiving, at the approval and notification controller, the approval or disapproval of the first change and the second change from the multiple users;
communicating the approval or disapproval of the first change and the second change to the multiple users; and
when the multiple users approve the first change or the second change, updating, at the distributed ledger controller, the document with the approved change.

14. The method of claim 12 wherein the first change and the second change are detected within a pre-determined time period of each other.

15. The method of claim 13 wherein the display displays the first change in a first color and the second change in a second color.

16. The method of claim 11 wherein the distributed ledger is a conclave blockchain.

17. A method for two or more users to concurrently modify an editable legal document in real-time, the method comprising:
each user of the two or more users joining a conclave blockchain comprising the document;
assigning, by a central server, to each user a login to the conclave blockchain, wherein when the user logs in, the user becomes an active user;
downloading to a smart glass uniquely assigned to each of the two or more users, a copy of the blockchain;
detecting, by a change detection controller, a first change made to the document by a first active user and a second change made by a second active user;
recording in the blockchain, by a distributed ledger controller, the first change and the second change;

communicating, by a distributed ledger partner controller, the first change and the second change to the two or more users;

displaying, on each smart glass, the first change and the second change;

requesting, by an approval and notification controller, approval or disapproval from the two or more users of the first change and the second change;

receiving, at the approval and notification controller, the approval or disapproval from the two or more users of the first change and the second change;

communicating the approval or disapproval to the two or more users; and when the two or more users approve the first change or second change, updating, at the distributed ledger controller, the document with the approved first or second change;

wherein each smart glass has an equal ability to change the document as every other smart glass assigned to each of the two or more users.

18. The method of claim 17 wherein the first active user and second active user are concurrently logged into the blockchain.

19. The method of claim 17 wherein the document is finalized when all changes are approved or disapproved.

* * * * *